United States Patent [19]
Liu et al.

[11] Patent Number: 5,854,678
[45] Date of Patent: *Dec. 29, 1998

[54] THREE-AXIS FIBER OPTIC GYROSCOPE HAVING A SINGLE SOURCE AND MULTI-COUPLER CONFIGURATION

[75] Inventors: Ren-Young Liu, Mesa; Ralph A. Bergh, Phoenix, both of Ariz.

[73] Assignee: Honeywell Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 672,249

[22] Filed: Jun. 28, 1996

[51] Int. Cl.⁶ ................................... G01C 19/72
[52] U.S. Cl. ............................................ 356/350
[58] Field of Search .................... 356/350, 345; 385/12, 14

[56] References Cited

U.S. PATENT DOCUMENTS

| | | |
|---|---|---|
| 4,445,780 | 5/1984 | Burns . |
| 4,479,715 | 10/1984 | Sheem . |
| 4,653,917 | 3/1987 | Moeller et al. . |
| 4,815,853 | 3/1989 | Lefevre . |
| 4,828,389 | 5/1989 | Gubbins et al. ................ 356/350 |
| 4,869,592 | 9/1989 | Bergh . |
| 4,953,935 | 9/1990 | Suchoski, Jr. et al. . |
| 5,080,488 | 1/1992 | Buehler et al. . |
| 5,118,190 | 6/1992 | Jurga et al. . |
| 5,146,956 | 9/1992 | Buehler et al. . |
| 5,150,956 | 9/1992 | Buhler et al. . |
| 5,157,461 | 10/1992 | Page ................................. 356/350 |
| 5,184,195 | 2/1993 | Goldner ........................... 356/350 |
| 5,189,488 | 2/1993 | Mark et al. ..................... 356/350 |
| 5,227,860 | 7/1993 | Hartl et al. . |
| 5,245,407 | 9/1993 | Nishiura et al. ................ 356/350 |
| 5,260,768 | 11/1993 | Cordova et al. ................ 356/350 |
| 5,293,439 | 3/1994 | Mori et al. . |
| 5,294,972 | 3/1994 | Kemmler . |
| 5,347,354 | 9/1994 | Muller et al. . |
| 5,373,361 | 12/1994 | Poisel et al. . |
| 5,430,544 | 7/1995 | Poisel et al. . |
| 5,486,921 | 1/1996 | Priest . |
| 5,491,763 | 2/1996 | van Deventer et al. . |

FOREIGN PATENT DOCUMENTS

| | | |
|---|---|---|
| 0388499A | 9/1990 | European Pat. Off. . |
| 0534435 | 3/1993 | European Pat. Off. ........ 356/350 |
| 0224511 | 12/1984 | Japan .............................. 356/350 |
| 9015967A | 12/1990 | WIPO . |

*Primary Examiner*—Samuel A. Turner
*Attorney, Agent, or Firm*—John G. Shudy, Jr.

[57] ABSTRACT

A gyroscope having three fiber optic loops for sensing rates of rotation in three axes orthogonal to one another. The gyroscope has one or two detectors and one source that is shared among the three fiber optic sensing loop subsystems with a special multi-coupler configuration. Also, portions of the rotation rate signal processing electronics, whether an open or closed loop configuration, are shared among the three sensing loops. The gyroscope may be a single mode optical fiber depolarized configuration or a polarization maintaining optical fiber configuration.

22 Claims, 11 Drawing Sheets

THREE-AXIS FIBER OPTIC GYROSCOPE HAVING A SINGLE SOURCE AND MULTI-COUPLER CONFIGURATION

BACKGROUND OF THE INVENTION

Typical inertial measurement units have three gyroscopes. A fiber optic inertial measurement system involves at least three fiber optic gyroscopes. Separate gyroscopes for each of the three axes involves a duplication of optical and electronic circuits.

SUMMARY OF THE INVENTION

The present invention is a three-axis fiber optic gyroscope that is appropriate for an inertial measurement unit. The gyroscope measures rates of rotation for each of the three orthogonal axes. The three-axis fiber optic gyroscope of the present invention uses fewer optical and electronic components while still efficiently delivering sufficient optical power from a source through each gyroscope to the detector. A single source, one or two detectors, one preamplifier and two directional couplers are used outside the three interferometers. In contrast, the same task performed by the standard approach in the art uses three single axis gyros that require three sources, three detectors, three preamplifiers and three directional couplers. The electronics for the gyroscopes may be open loop or closed loop. Serrodyne, digital phase step and dual ramp electronics are options for a closed loop configuration. The interferometer or gyroscope for each axis of a three axis system can deliver nearly the same amount of power to the detector as a single axis configuration.

DESCRIPTION OF THE PREFERRED EMBODIMENTS

Figure 1:
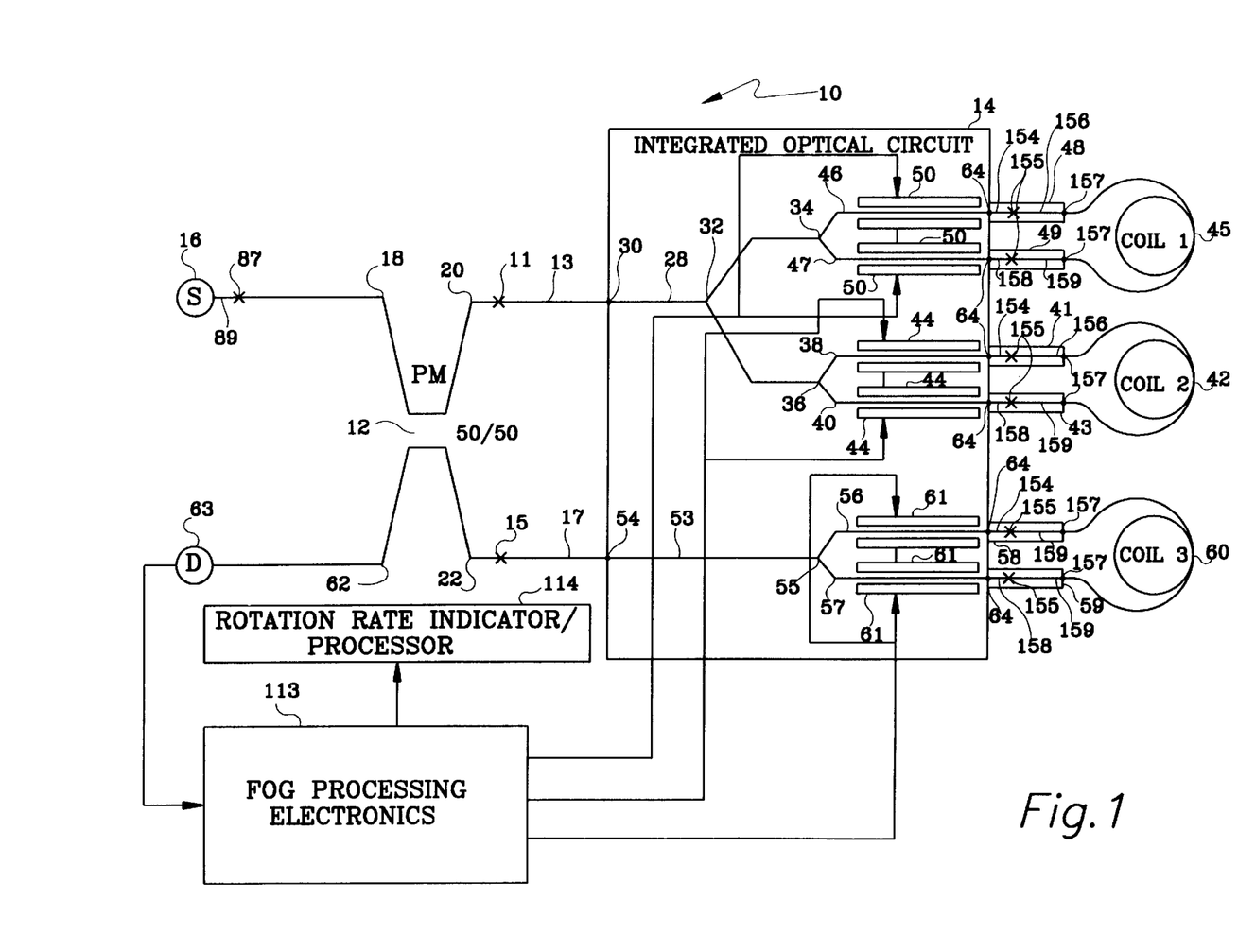
FIG. 1 shows the optical configuration for the three axis gyroscope having one polarization maintaining coupler and four Y junctions.

FIG. 1 shows a configuration 10 for a three axis fiber optic gyroscope (FOG) having one polarization maintaining (PM) fiber coupler 12 and an integrated optical circuit (IOC) 14 with four Y junctions 32, 34, 36 and 55. Coupler 12 is a coupler fabricated from PM fiber. Light source 16 emits broad band light having a middle wavelength of 0.83 microns. Light source 16 may be at some other wavelength. The light enters coupler 12 via fiber or port 18 and the light goes through coupler 12 wherein about half the light goes out on port or fiber 20 and the other half the light goes out on port or fiber 22, under the assumption that there is no light loss in coupler 12.

In this embodiment, coupler 12 is designed for 0.83 micron light. Fiber 20 is connected to pigtail 13 of waveguide 28 via splice 11, of integrated optical circuit (IOC) 14 with aligned axes at splice 11 and connection 30. IOC 14 may be a proton exchange or titanium indiffused lithium niobate device. Also, IOC 14 may be fabricated from other materials such as silicon, tantalum, polymers and so on. The proton exchange device has polarizing waveguides 28, 38, 40, 46, 47, 53, 56, and 57. If IOC 14 is a titanium indiffused device, then the IOC has a conductive sheath on it and over the waveguides thereby causing the respective waveguides to be polarizing.

The light is split 50/50 at Y junction 32 such that one half of the light to junction 32 goes to junction 34 and the other half of the light as a result of the split by junction 32 goes to junction 36. This ratio of light is with the assumption that there is little or no loss of light at the junctions or in the waveguides of IOC 14. The other half of the light that enters junction 36 is split in half such that light propagates down light waveguides 38 and 40. Light in waveguide 38 propagates through connection 64, depolarizer 41 and through loop 42 and on back through depolarizer 43, connection 64 and down waveguide 40. Light passing through waveguide 40 is subject to modulation by modulator 44. Light propagating toward loop 42 down waveguide 40 goes through depolarizer 43 and through the loop 42 and back out of loop 42 and through depolarizer 41 and down through waveguide 38 of IOC 14. The returning beams of light are combined from waveguides 38 and 40 at Y junction 36 and move towards junction 32.

Depolarizers 41 and 43 may be constructed in various ways. For instance, in depolarizer 41, a PM fiber 154 is attached to IOC 14 at point 64, with its birefringent axes aligned with the birefringent axes of waveguide 38. Fiber 154 may be a pigtail of IOC 14. Another PM fiber 156 is spliced to fiber 154, with the birefringent axes of fibers 154 and 156 aligned at about 45 degrees relative to each other, at connection point 155. Fiber 156 is spliced to single mode non-polarization maintaining fiber of coil 42 at connection 157. Fiber 156 is typically more than twice the length as fiber 154.

On the other hand, depolarizer 41 may have only one PM fiber 154 which has birefringent axes aligned at about 45 degrees relative to the axes of waveguide 38, at pigtail 64. Fiber 154 is then spliced to coil 42 at connection point 157. The beat length of fiber 154 is more than twice the beat length of waveguide 38. Splice 155 and fiber 156 are not needed in this depolarizer configuration.

Depolarizer 43 may be used in conjunction with depolarizer 41 or it may be absent, thereby resulting in only one depolarizer 41 for coil 42. However, both depolarizers 41 and 43 result in better FOG performance.

If depolarizer 43 is to be used it has the same structure as depolarizer 41 except that the length of fiber 158 is slightly different in length than that of fiber 154 and that the length of fiber 159 is more than four times the length of fiber 158, although fiber 159 may be more than twice the length of fiber 156.

In the depolarizer 41 configuration having just the one PM fiber 154 with axes aligned with waveguide 38 axes, a similarly structured depolarizer 43 may or not be incorporated. If depolarizer 43 is incorporated, then the structure of the depolarizer may be that of two PM fibers 158 and 159, with fiber 159 having more than twice the beat length of fiber 154 in the depolarizer configuration where fiber 154 axes are aligned at 45 degrees relative to waveguide axes at connection point 64. Depolarizer 43, in conjunction with either depolarizer 41 configuration, may have only fiber 158 which has its birefringent axes aligned at 45 degrees relative to the axes of waveguide 40 at pigtail 64. Fiber 158 in the latter structure, without splice 155 and fiber 159, has a beat length that is more than twice the beat length of waveguide 40, or it may have more than four times the beat length of waveguide 40 if depolarizer 41 has the same kind of structure as the latter depolarizer 43.

Depolarizers 48 and 49 have similar structure combinations as depolarizers 41 and 43, respectively. Likewise depolarizers 58 and 59 have similar structure combinations as depolarizers 41 and 43, respectively. The structures of depolarizers noted here are applicable to all figures having depolarizers 41, 43, 48, 49, 56 and 59.

A light from junction 34 is split and light beams propagate down waveguides 46 and 47 on through connection 64 and depolarizers 48 and 49, respectively, and counterpropagate through loop 45 and return through depolarizers 49 and 48, and connection 64 respectively. A light that passes either way through waveguide 47 is subject to modulation by modulator 50. The returning light beams from loop 45 via waveguides 46 and 47 are combined at junction 34 and the resultant light goes on to junction 32 which is combined with light from junction 36. The combined light goes down waveguide 28, through connection 30 and into fiber or port 20 of coupler 12.

The other portion of the light from source 16 in coupler 12 goes through fiber or port 22 on to waveguide 53 of IOC 14 via splice 15, pigtail 17 and connection 54 with aligned axes at splice 15 and connection 54. Light going through waveguide 53 is split at Y junction 55 into wherein half the light goes down waveguide 56 and the other half the light from waveguide 53 goes through waveguide 57. The light goes through depolarizers 58 and 59 from waveguides 56 and 57, respectively. The light waves or beams counterpropagate through loop 60 and return through depolarizers 59 and 58 and go through waveguides 57 and 56, respectively, to be combined at Y junction 55. Light propagating through waveguide 57 may be modulated by modulator 61. The combined light from junction 55 propagates down waveguide 53, through connection 54 and into port or fiber 22 of coupler 12. About half the light from port 20 goes into port or fiber 62 and half the light from port 22 is combined with the light from port 20 and goes down port 62 into detector 63.

The light from port 62 constitutes interferences of pairs of beams of loops 42, 45 and 60. Detector 63 electrically converts the light beams and their respective interferences into electrical signals which are deciphered into rate of rotation information of loops 42, 45 and 60. IOC 14 is designed for 0.83 micron wavelength of source light. The depolarizers which may be made of PM fiber are aligned respectively to waveguides of IOC 14 at a 45 degree angle (+/−2 degrees) between the polarization axes of each PM fiber and the respective waveguide of IOC 14. The resultant depolarizers are designed for 0.83 micron of light.

The fiber for coils 42, 45 and 60 is single mode fiber, that is, it is non-polarization maintaining fiber, and is designed for a wavelength of 1.3 microns of light. The depolarizers 48, 49, 41, 43, 58 and 59 are spliced to the single mode fiber of the respective loops.

Figure 2:
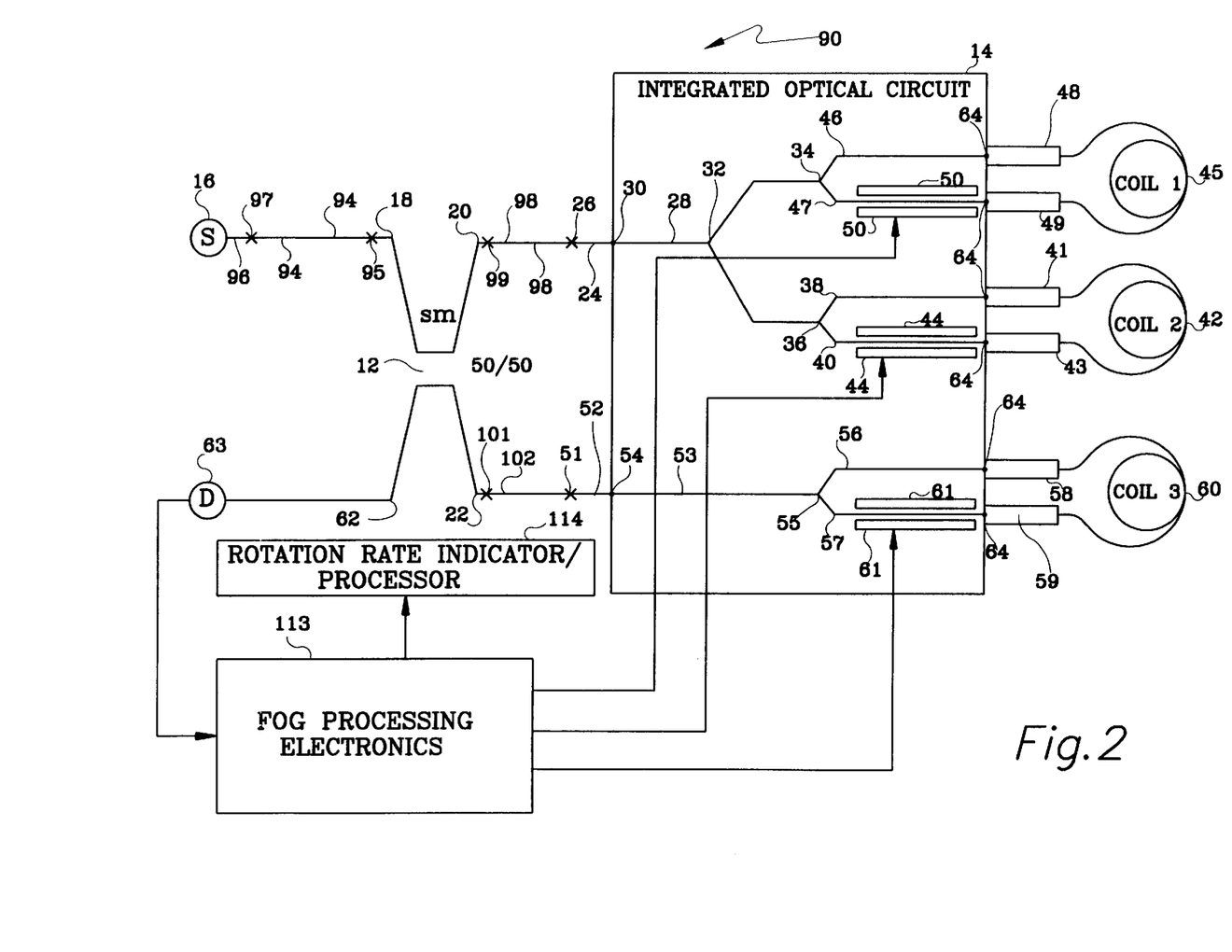
FIG. 2 shows the optical configuration for the three axis gyroscope having one non-polarization maintaining coupler and four Y junctions.

FIG. 2 shows a configuration 90 for a three axis fiber optic gyroscope (FOG) having one single-mode fiber coupler 12 and an integrated optical circuit (IOC) 14 with three Y junctions 34, 36, 55. Coupler 12 is a coupler fabricated from single mode non-polarization maintaining (SM) fiber. Light source 16, which is a laser diode, emits broad band light having a middle wavelength of 0.83 microns. Light source 16 may instead be a fiber optic light source of another wavelength.

There may be a polarization maintaining (PM) fiber 94 spliced onto port 18 of coupler 12 at point 95. PM fiber 94 axes are aligned at 45 degrees relative to the source 16 PM pigtail 96 axes at splice 97. Instead, fiber 94 may be aligned at 45 degrees at source 16 itself relative to the axis of the polarized light. The combination of fibers 94 and 96, and splice 97 is not required but is desired for use with SM coupler 12. The fiber 94 and 96 and splice 97 combination is not used with a non-polarized fiber light source, which emits non-polarized light, as source 16.

The light enters coupler 12 via fiber or port 18 and the light goes through coupler 12 wherein about half the light goes through port or fiber 20 and the other half the light goes through port or fiber 22, under the assumption that there is no light loss in coupler 12. Fiber coupler 12 is designed for 0.83 micron light. Fiber 20 at point 99 is spliced to a piece of PM fiber 98. PM fiber 98 is connected to a PM pigtail 24 at a 45 degree-axis aligned splice 26. Fiber 24 has a length that is at least twice the length of fiber 98. Fiber pigtail 24 is attached to waveguide 28 at point 30 with aligned axes. The depolarizer could instead include just PM fiber 24 having a 45 degree axis alignment with waveguide 28 at connection 30. The beat length of fiber 24 would be less than one-half of the beat length of waveguide 28. The light is split 50/50 at Y junction 32 such that one half of the light to junction 32 goes to junction 34 and the other half of the light as a result of the split by junction 32 goes to junction 36. The 50/50 ratio of light is based on the assumption that there is little or no loss of light at the junction or in the waveguides of IOC 14. The light that enters junction 36 is split in half such that each half portion of the light propagates down light waveguides 38 and 40 respectively. Light in waveguide 38 propagates through connection 64, depolarizer 41 and through loop 42 and on back through depolarizer 43, connection 64 and down waveguide 40. Light passing through waveguide 40 is subject to modulation by modulator 44.

Light propagating toward loop 42 down waveguide 40 goes through depolarizer 43 and through loop 42 and back out of loop 42 and through depolarizer 41 and down through waveguide 38 of IOC 14. The returning beams of light are combined from waveguides 38 and 40, at Y junction 36 and moves towards junction 32.

A light from junction 34 is split and light beams propagate down waveguides 46 and 47 on through depolarizers 48 and 49, respectively, and counterpropagate through loop 45 and return through depolarizers 49 and 48, respectively. A light that passes either way through waveguide 47 is subject to modulation by modulator 50. The returning light from loop 45 via waveguides 46 and 47 is combined at junction 34 and the resultant light goes on to junction 32 which is combined with light from junction 36.

The combined light goes down waveguide 28, through connection point 30 and through PM pigtail fiber 24, splice 26, PM fiber 98, and splice 99, respectively, or alternatively just through 45 degree connection 30 and PM fiber 24, into fiber or port 20 of coupler 12.

The other portion of the light from source 16 goes through fiber or port 22 spliced at point 101 to a piece of PM fiber 102 which is at a 45 degree axis splice 51 connected to a PM pigtail or fiber 52. The length of fiber 52 is at least twice that of fiber 102. Fiber 52 is connected with aligned axes to waveguide 53 of IOC 14 at point 54. The depolarizer could instead include just PM fiber 52 having a 45 degree axis alignment with waveguide 53 at connection 54. The beat length of fiber 52 would be less than one-half of the beat length of waveguide 53. Light going through waveguide 53 is split at Y junction 55 into wherein half the light goes down waveguide 56 and the other half the light from waveguide 53 goes through waveguide 57. The light goes through depolarizers 58 and 59 from waveguides 56 and 57, respectively. The light waves or beams counterpropagate through loop 60 and return through depolarizers 59 and 58 and go through waveguides 57 and 56, respectively, to be combined at Y junction 55. Light propagating through waveguide 57 may be modulated by modulator 61. The combined light from junction 55 propagates down waveguide 53, through point 54, pigtail 52, splice 51, fiber 102, and splice 101, or alternatively just through 45 degree connection 54 and PM fiber 52, into port or fiber 22 of coupler 12. About half the light from port 20 goes into port or fiber 62 and half the light from port 22 is combined with the light from port 20 and goes down port 62 on into detector 63. The light from port 62 constitutes interferences of pairs of beams of loops 42, 45 and 60. Detector 63 electrically converts the light beams and their respective interferences into electrical signals which are deciphered into rate of rotation information of loops 42, 45 and 60.

IOC 14 is designed for 0.83 micron wavelength of source light. The depolarizers which may be made of PM fiber that is aligned respectively to waveguides of IOC 14 at a 45 degree angle (+/−2 degrees) with respect to the polarization axis of the fiber of the depolarizer and the waveguide of IOC 14. The polarizers are designed for 0.83 micron of light. The fiber for coils 42, 45 and 60 is single mode fiber, that is, it is non-polarization maintaining fiber, and is designed for a wavelength of 1.3 microns of light. Depolarizers 48, 49, 41, 43, 58 and 59 are of 0.83 micron PM fiber which is spliced to the single mode fiber of the respective loops and to IOC 14 at points 64 to the respective waveguides.

Figure 3A:
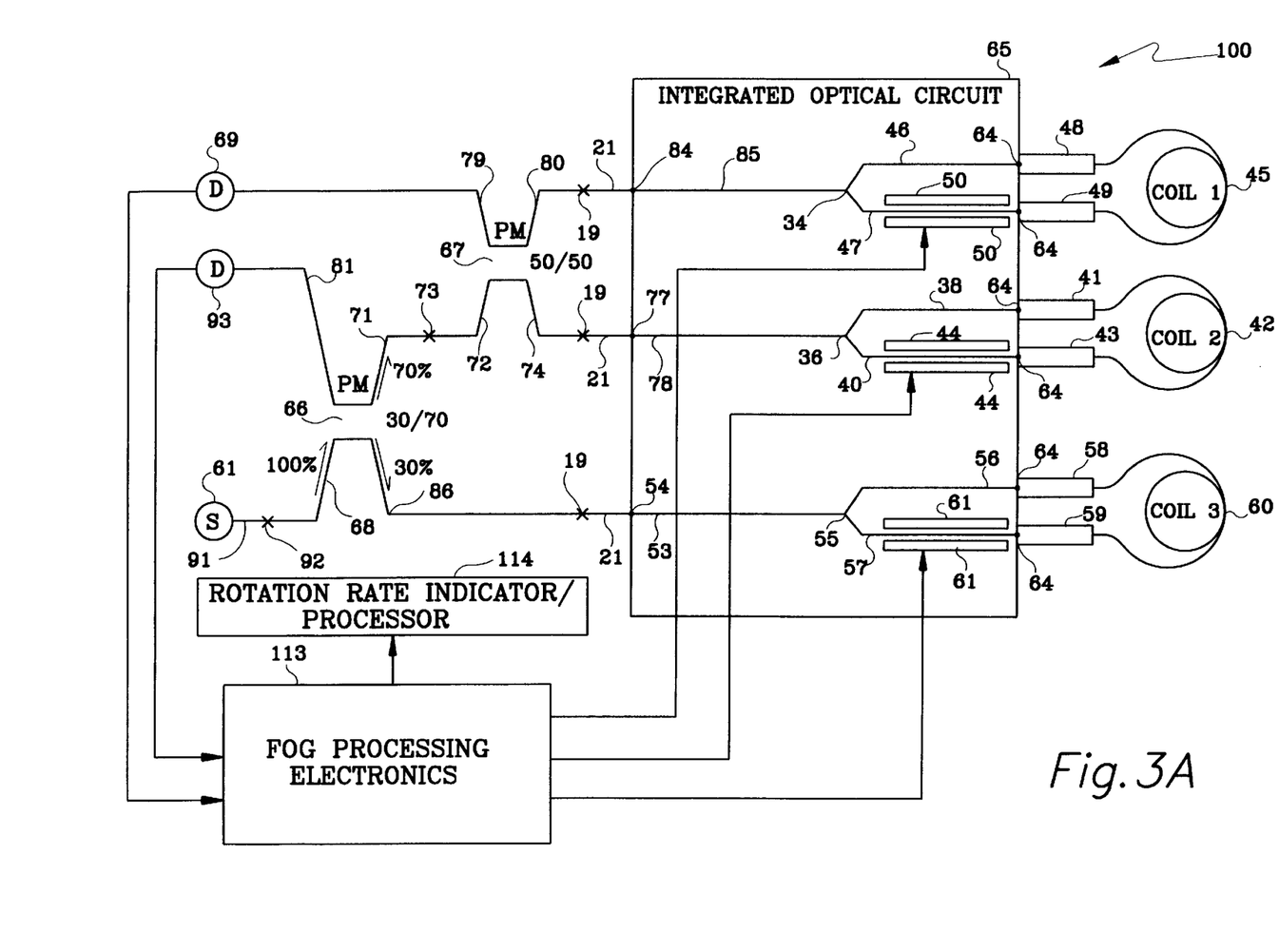
FIG. 3a shows a three axis gyroscope having two polarization maintaining couplers and three Y junctions.

Configuration 100 of FIG. 3a involves an IOC 65 which may be split up into three separate IOCs having junctions 34, 36 and 55, respectively, for each of the FOG loops 45, 42 and 60. IOC 65 may have the same material and functional characteristics as IOC 14. IOC 14 and IOC 65 are preferred to have polarizing waveguides, although the waveguides may be polarization maintaining or non polarization maintaining.

Configuration 100 uses two PM fiber optic couplers 66 and 67. IOC 65 has no Y junction splitter like Y junction 32 of IOC 14 of configuration 10. Source 16 is a laser diode and emits 0.83 micron broad band light which goes to coupler 66 via pigtail 91, splice 92 and port 68. Splice 92 is optional. To achieve equal detected optical power from each of sensing coils 42, 45 and 60, the splitting ratio of first directional coupler 66 is chosen appropriately. In the ideal case where each of directional couplers 66 and 67 are loss-less and each of the three coils 42, 45 and 60 are equally efficient, the splitting ratio of 33/67 at coupler 66 and 50/50 for coupler 67, produces or results in an equal optical power from each sensor. If couplers 66 and 67 have losses, the light making additional passes through the respective coupling region will suffer additional attenuation. Thus, the splitting ratio of coupler 66 needs to be different to compensate for this extra loss and still keep the power levels at detectors 69 and 93 the same for each of the three axes incorporating loops 42, 45 and 60. One example of this is the use of a 30/70 instead of a 33/67 splitting ratio for coupler 66 to account for the loss occurred in couplers 66 and 67.

Light for the first loop 42 leaves source 16 and goes through port 68 of coupler 66 and an approximately 70 percent portion of that light is split off into port 71 which goes to port 72 of coupler 67 via splice 73 with aligned axes. Fifty percent of the light in port 72 goes to port 74 of coupler 67 and on through connection point 77, with aligned axes, into waveguide 78. The light goes through junction 36 through the components of the gyroscope having loop 42.

The light returns after counterpropagating through loop 42 back through waveguide 78, connection point 77, and on into port or fiber 74. How the light moves through the components associated with loop 42 is described above with respect to configuration 10. Light coming back through port 74 of coupler 67 is split 50/50 and half that light goes to port 79 which is pigtailed to detector 69 thereby the light is being converted by detector 69 into electrical equivalents of the light signals. The light returns from loop 42 going through port 74 of coupler 67, and also the other portion of the light goes through port or fiber 72 through aligned-axes splice 73 and port or fiber 71 of coupler 66. A portion of that light continues on through coupler 66 to port 81, and fiber 81 is either connected to detector 69 along with fiber 79, or to a second detector 93, to also be converted into representative electrical signals.

Light from source 16 for loop 45 goes through port 68 of coupler 66 which is portioned off at 70 percent to port 71. The light from port 71 goes through aligned-axes splice 73 and on through port 72 of coupler 67. Half of the light in port 72 goes to port 80 and on to IOC 65 at point 84. Point 84 is an aligned axis connection between port 80 and waveguide 85, with or without splice 19 and pigtail 21. Similarly, light to or from port 74 of coupler 67 and port 86 of coupler 66 may or may not go through splice 19 and pigtail 21. Light from point 84 goes through waveguide 85 on to be split by Y junction 34. The light travels through the components associated with loop 45 as described above with respect to configuration 10. Light from junction 34, after counterpropagating in loop 45, goes through waveguide 85, through point 84 on to port 80 of fiber optic coupler 67. A portion of the light in port 80 goes on to port 79 on to detector 69. The other portion of the light in port 80 goes through coupler 67 on to port 72 and through splice 73 and port 71. A portion of light in port 71 goes on to port 81 of coupler 66 and to detector 69 or second detector 93. The received light at detector 69 or second detector 93 again is converted into electrical signals representative of the received optical signals.

The third axis rotation rate sensor incorporating loop 60, involves light from source 16 going through coupler 66 of which 30 percent goes on into port or fiber 86. The light from port 86 goes on through point 54 to IOC 65, and continues on through waveguide 53. The propagation of light on into loop 60 is described above with respect to configuration 10. The light counterpropagating in loop 60 is combined at light junction 55 and returns through waveguide 53, point 54 and on into port 86 of coupler 66. 70 percent of the returning light in port 86 is coupled onto port 81 of coupler 66. The light in port 81 goes on to detector 69 which converts the light into electrical signals representative of the optical signals in port 81.

Figure 3B:
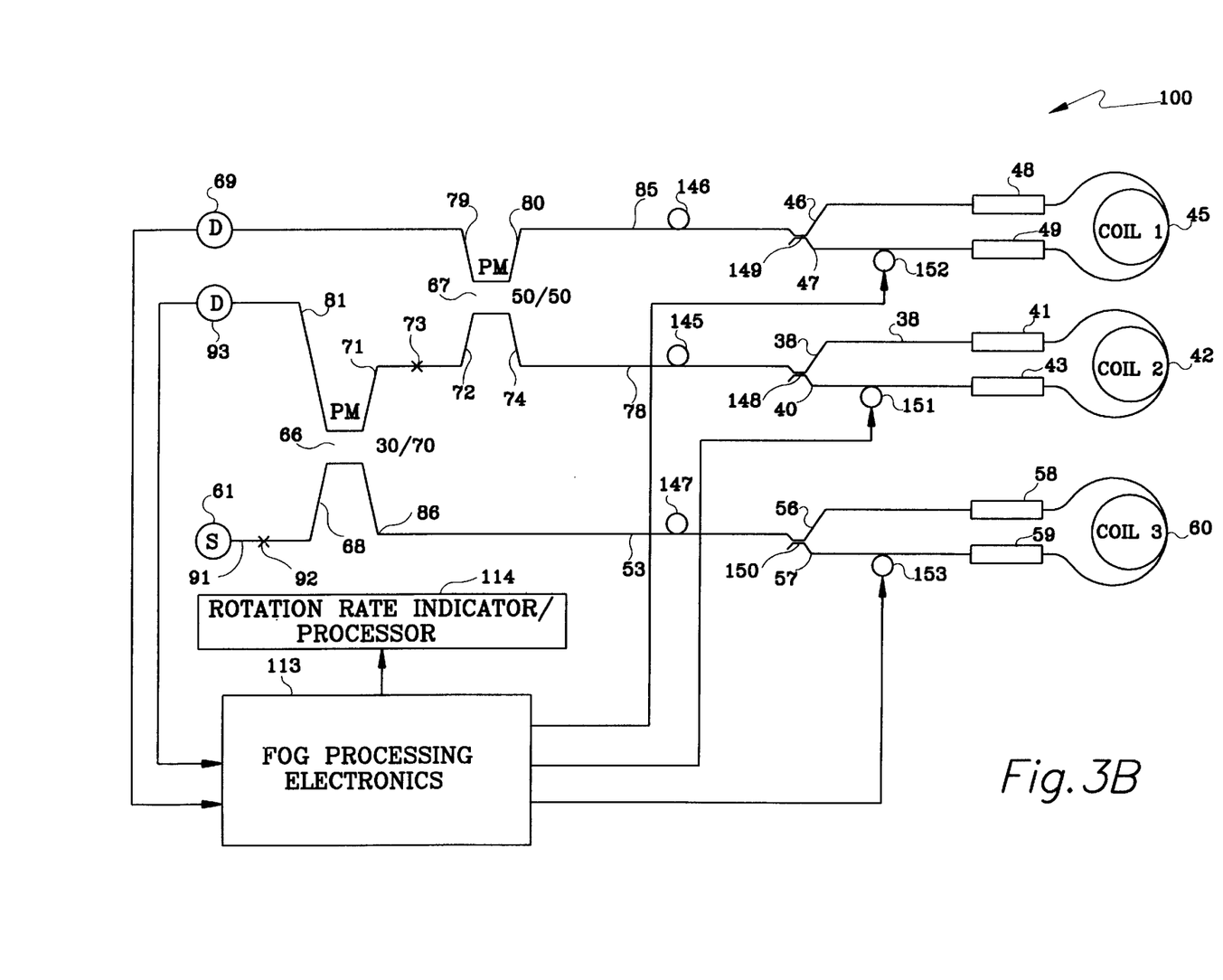
FIG. 3b reveals a three axis gyroscope having two polarization maintaining couplers, and three couplers at the sensing loops.

FIG. 3b shows a variation of configuration 100 in FIG. 3a. Y junctions 34, 36 and 55 are replaced with directional couplers 149, 148 and 150, respectively. Polarizers 145, 146 and 147 are placed in optical fiber light paths between couplers 67 and 68, and couplers 148, 149 and 150, respectively. Electrooptic phase modulators 44, 50 and 61 are replaced with optical fiber piezoelectric phase modulators 151, 152 and 153, respectively. The IOC 65 waveguides functioning as light paths are replaced with optical fiber light paths.

Figure 4A:
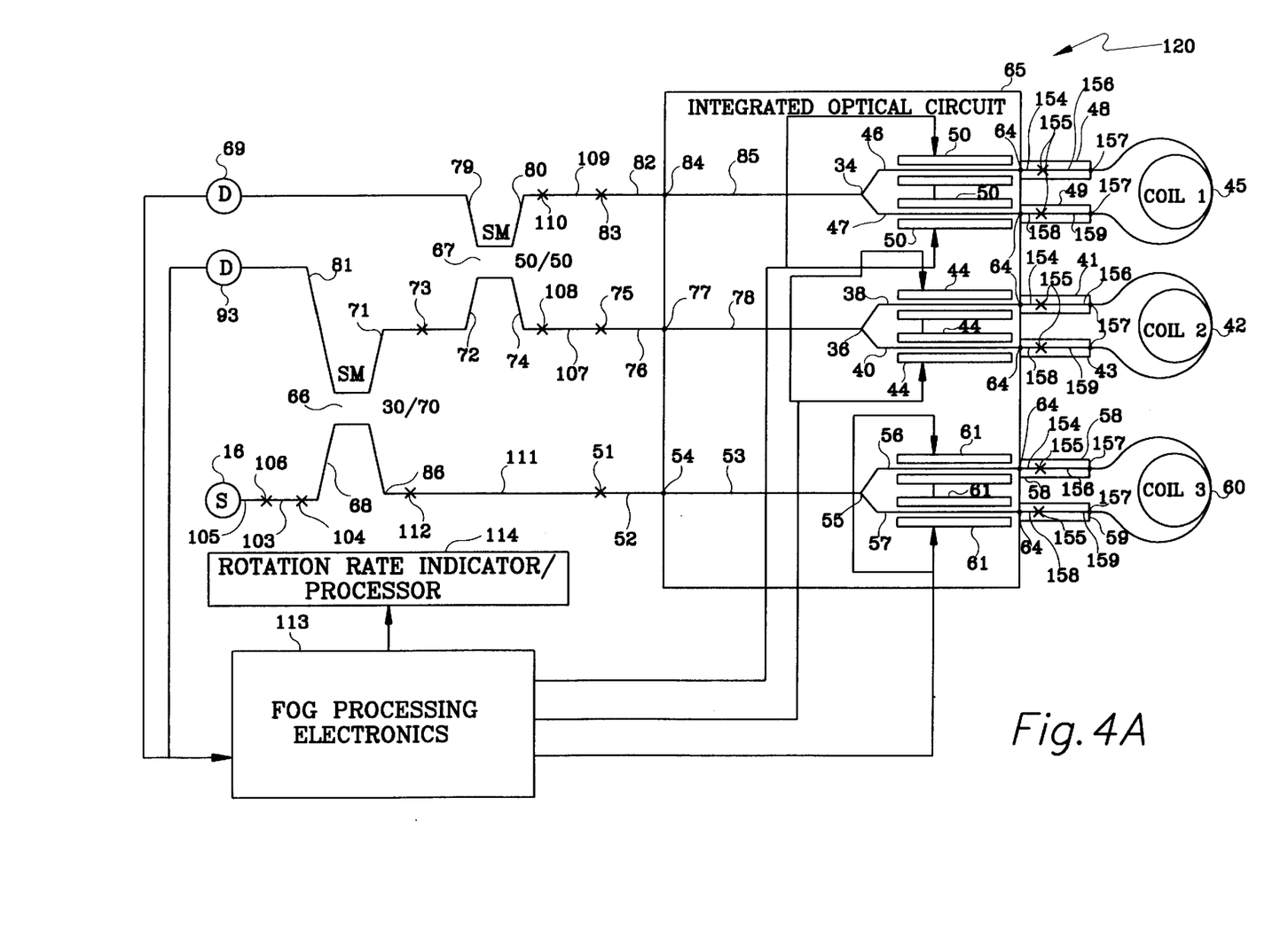
FIG. 4a shows a three axis gyroscope having two non-polarization maintaining couplers and three Y junctions.

Configuration 120 of FIG. 4a involves IOC 65 which may be split up into three separate IOCs for each of the FOG loops 42, 45 and 60. This configuration uses two single mode non-polarization maintaining (SM) fiber optic couplers 66 and 67. IOC 65 has no Y junction splitter like Y junction 32 of IOC 14 of configuration 90. Source 16 is a laser diode that emits 0.83 micron broad band light which goes to coupler 66 via port 68. Source 16 may be a fiber light source of another wavelength rather than that of a laser diode. Between source 16 and port 68 may be a piece of polarization maintaining (PM) fiber 103 connected to port 68 at connection 104 and to a PM pigtail 105 having polarization or birefringent axes aligned 45 degrees at splice 106. Instead, fiber 103 may be coupled directly to source 16 with its axes aligned at 45 degrees to the direction of polarization of the light from source 16. Fiber 103 and splice 106 are not necessary but preferred with a laser diode source. Fiber 103 and splice 106 are not used when source 16 is a fiber light source emanating unpolarized light.

To achieve equal detected optical power from each of sensing coils 42, 45 and 60, the splitting ratio of first directional coupler 66 is chosen appropriately. In the ideal case where each of directional couplers 66 and 67 are loss-less and each of the three coils 42, 45 and 60 are equally efficient, the splitting ratio of 33/67 at coupler 66 and 50/50 for coupler 67, produces or results in an equal optical power from each sensor. If couplers 66 and 67 have losses, the light making additional passes through the respective coupling region will suffer additional attenuation. Thus, the splitting ratio of coupler 66 needs to be different to compensate for this extra loss and still keep the power at detector 69 the same for each of the three axes incorporating optical fiber loops 42, 45 and 60. One example of this is the use of a 30/70 instead of a 33/67 splitting ratio for coupler 66 to account for the loss occurred in couplers 66 and 67.

Light for the first loop 42 leaves source 16 and goes through pigtail 105, splice 106, fiber 103, splice 104, and port 68 of coupler 66. Approximately 70 percent portion of that light from port 68 is split off into port 71 which goes to port 72 of coupler 67 via splice 73. Fifty percent of the light in port 72 goes to port 74 of coupler 67 and on through a piece of PM fiber 107 connected to port 74 at connection 108, and splice 75 which connects PM fiber 107 to a PM pigtail fiber 76 with a 45 degree alignment of the axes of fibers 107 and 76. The length of fiber 76 is at least twice that of fiber 107. Light goes through pigtail 76 on through connection point 77 into waveguide 78. The depolarizer could instead include just PM fiber 76 having a 45 degree axis alignment with waveguide 78 at connection 77. The beat length of fiber 76 would be less than one-half of the beat length of waveguide 78. The light goes through junction 36 through the components of the gyroscope having loop 42. The light returns after counterpropagating through loop 42 back through waveguide 78, connection point 77, pigtail 76, splice 75, fiber 107 and splice 108, or alternatively just through 45 degree connection 77 and fiber 76, on into port or fiber 74. How the light moves through the components associated with loop 42 is described above with respect to configuration 90.

Light coming back through port 74 of coupler 67 is split 50/50 and half that light goes to port 79 which is pigtailed to detector 69 wherein the light is converted into electrical equivalents of the light signals. The light returns from loop 42 going through port 74 of coupler 67, and the other portion of the light goes through port or fiber 72 through splice 73 and port or fiber 71 of coupler 66. A portion of that light continues on through coupler 66 to port 81 and to either a two-input (both port 81 and 79) detector 69 or a second detector 93 to be converted into representative electrical signals.

Light from source 16 for loop 45 goes through PM pigtail 105, 45 degree splice 106, PM fiber 103, splice 104, and port 68 of SM coupler 66 which is portioned off at 70 percent to port 71. The light from port 71 goes through splice 73 and on through port 72 of coupler 67. Half of the light in port 72 goes to port 80, a piece of PM fiber 109 connected to port 80 at connection splice 110, and on through a 45 degree splice 82 through a PM pigtail 83 which is connected to IOC 65 at point 84. Splice 82 aligns the birefringent axes of PM fibers 83 and 109 at 45 degrees. The length of fiber 83 is at least twice that of fiber 109. The depolarizer could instead include just PM fiber 83 having a 45 degree axis alignment with waveguide 85 at connection 84. The beat length of fiber 83 would be less than one-half of the beat length of waveguide 85.

Light from connection 84 goes through waveguide 85 on to be split by Y junction 34. The light travels through the components associated with loop 45 as described above with respect to configuration 90. Light from junction 34, after counterpropagating in loop 45, goes through waveguide 85, through connection point 84, pigtail fiber 83, splice 82, fiber 109, or alternatively just through 45 degree connection 84 and fiber 83, and through splice 110 on to port 80 of fiber optic coupler 67. A portion of the light in port 80 goes on to port 79 on to detector 69. The other portion of the light in port 80 goes through coupler 67 on to port 72 and through splice 73 and port 71. A portion of light in port 71 goes on to port 81 of coupler 66 and to either a two fiber input (port 79 and 81) detector 69 or a second detector 93. The received light at detector 69 and detector 93 is converted into electrical signals representative of the received optical signals.

The third axis rotation rate sensor incorporating loop 60, involves light from source 16 going through pigtail 105, splice 106, fiber 103, splice 104, port 68 and coupler 66 of which 30 percent goes on into port or fiber 86. A piece of PM fiber 111 is connected to port 86 at splice 112. Fiber 111 is connected to PM pigtail 52 at splice 51 with axes of fiber 111 and pigtail 52 aligned with each other at 45 degrees. Fiber 52 has a length at least twice that of fiber 111. The light from port 86 goes on through splice 112, fiber 111, and splice 51. The depolarizer could instead include just PM fiber 52 having a 45 degree axis alignment with waveguide 53 at connection 54. The beat length of fiber 52 would be less than one-half of the beat length of waveguide 53.

Light coming through a 45 degree splice 51 on to pigtail 52 which is connected at connection 54 to IOC 65, continues on through waveguide 53. The propagation of light on into loop 60 is described above with respect to configuration 10. The light counterpropagating in loop 60 is combined at waveguide junction 55 and returns through waveguide 53, connection point 54, pigtail 52, splice 51, fiber 111, or alternatively just through 45 degree connection 54 and fiber 52, splice 112, and on into port 86 of coupler 66. 70 percent of the returning light in port 86 is coupled onto port 81 of coupler 66. The light in port 81 goes on to the second input of a two-input (ports 79 and 81) detector 69 or, alternatively, to a second detector 93 which converts the light into electrical signals representative of the optical signals in port 81.

Figure 4B:
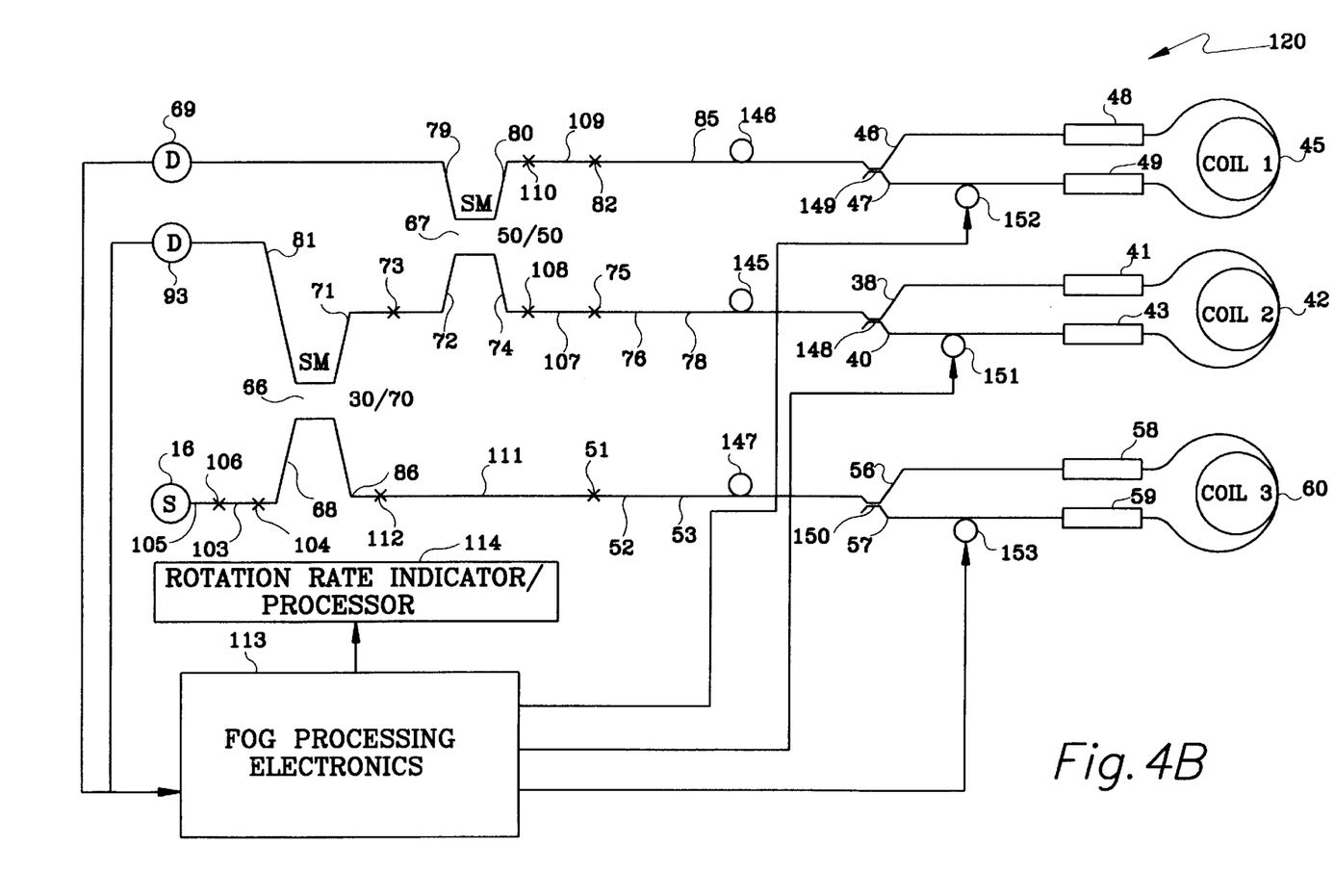
FIG. 4b reveals a three axis gyroscope having two non-polarization maintaining couplers, and three couplers at the sensing loops.

FIG. 4b shows a variation of configuration 120 in FIG. 4a. Y junctions 34, 36 and 55 are replaced with directional couplers 149, 148 and 150, respectively. Couplers 149, 148 and 150 are preferably PM couplers; although they could be SM couplers resulting in a FOG having lower performance capabilitites. Polarizers 145, 146 and 147 are placed in optical fiber light paths between couplers 67 and 66, source 16 and couplers 148, 149 and 150, respectively. Electrooptic phase modulators 44, 50 and 61 are replaced with optical fiber piezoelectric phase modulators 151, 152 and 153, respectively. The IOC 65 waveguides functioning as light paths are replaced with optical fiber light paths.

Figure 5:
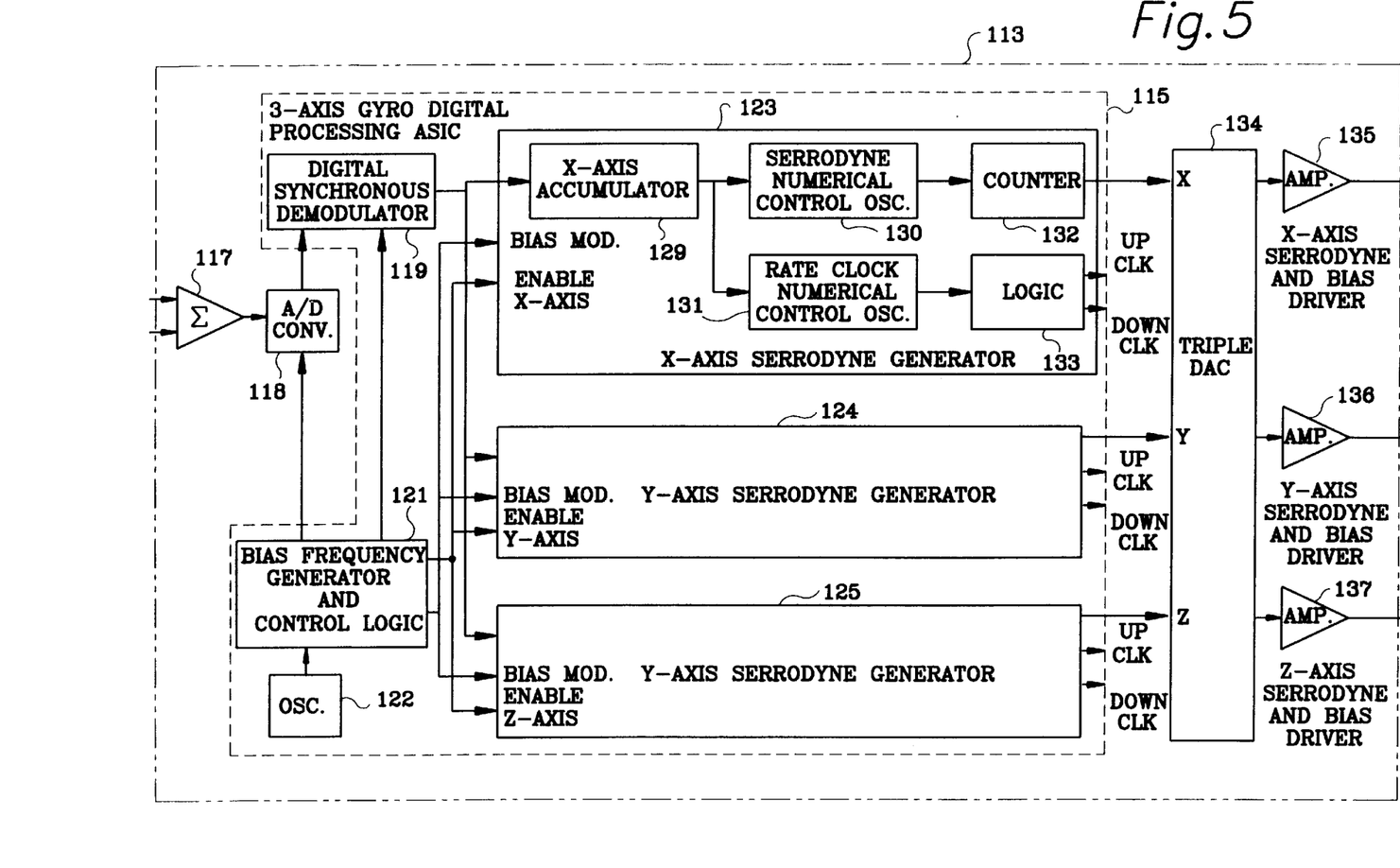
FIG. 5 shows an example of closed loop serrodyne electronics.
Figure 6:
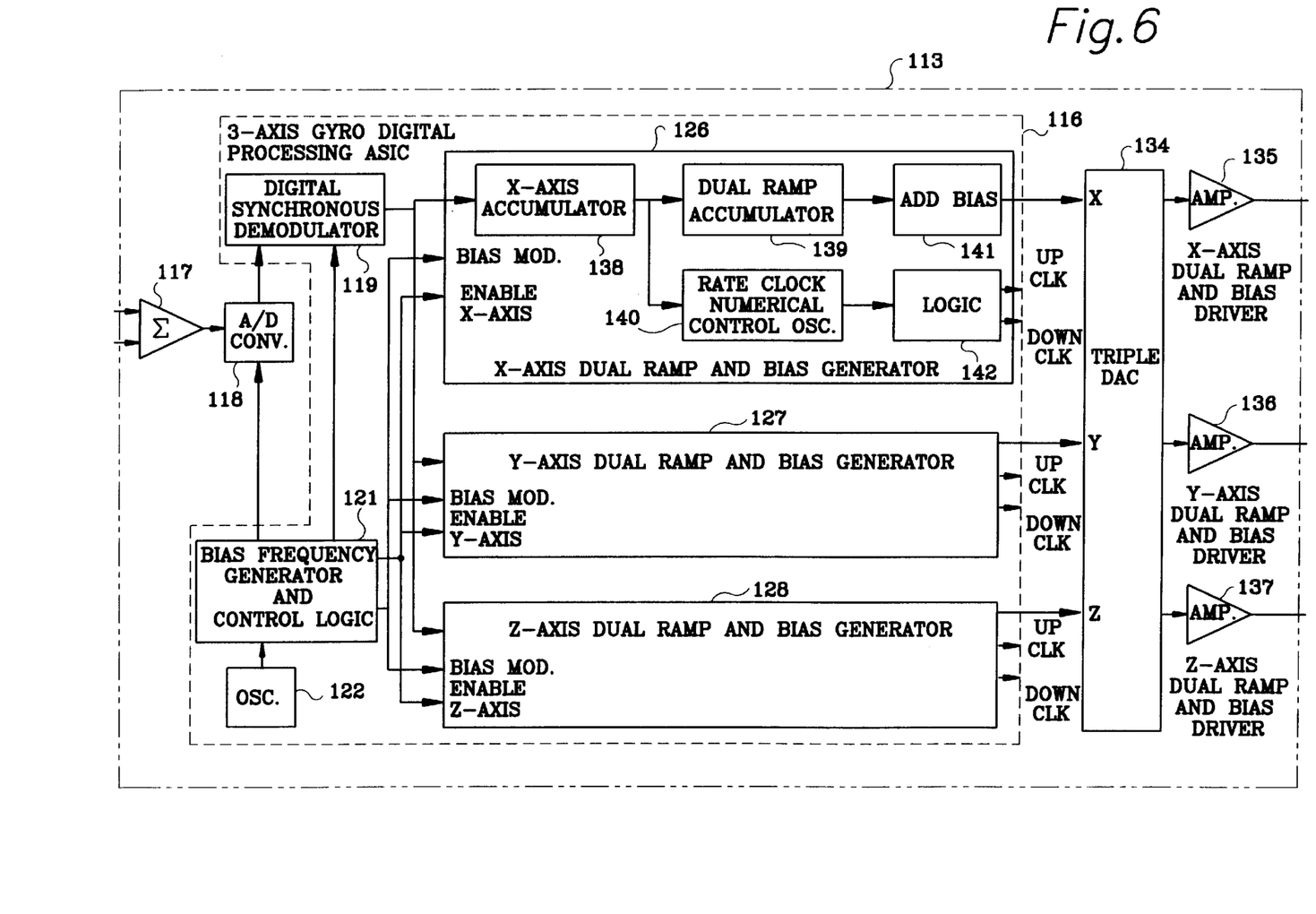
FIG. 6 shows an example of dual ramp closed loop electronics.
Figure 7:
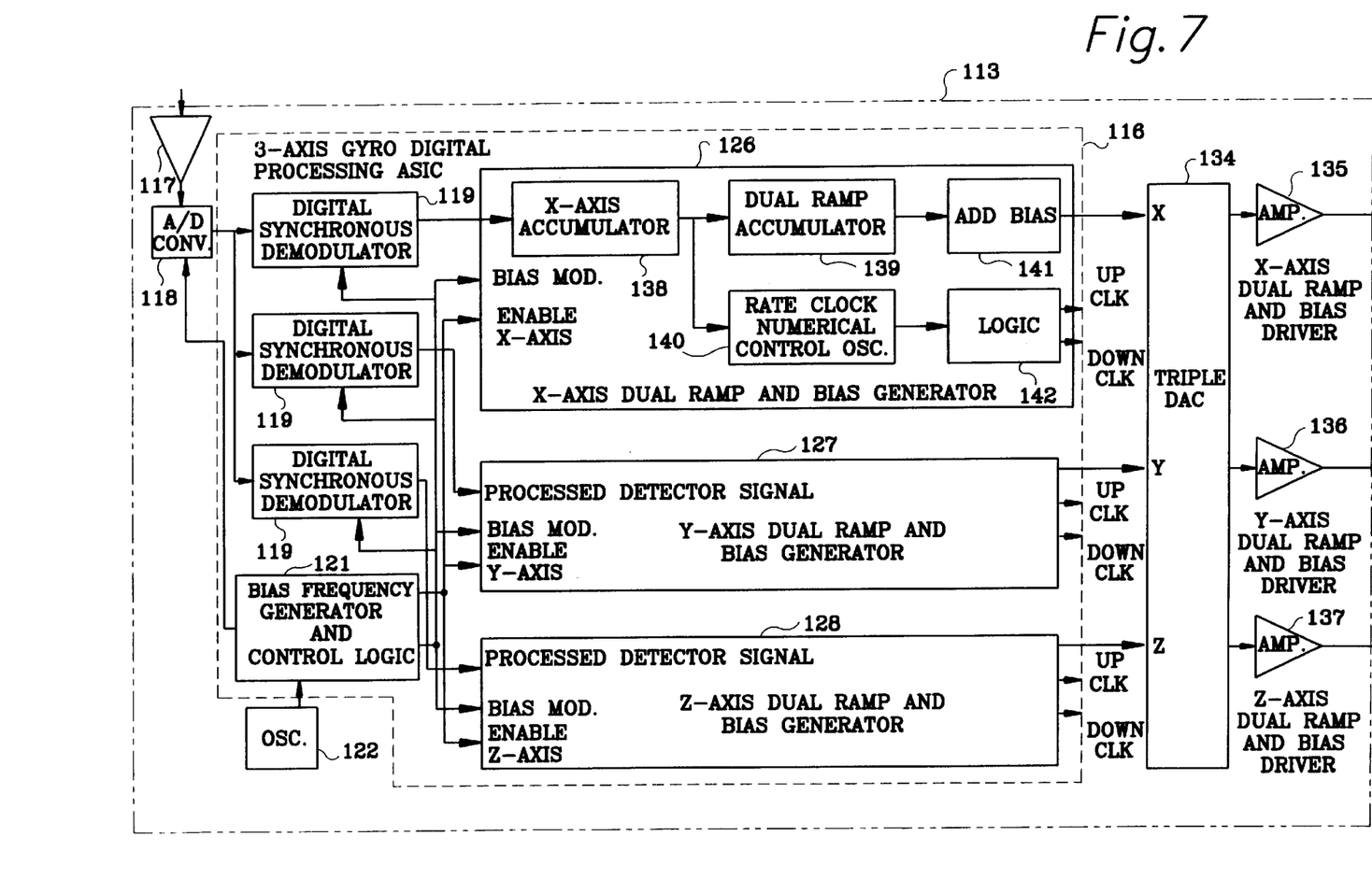
FIG. 7 shows the dual ramp closed loop electronics having a demodulator for each axis.

Configurations 10, 90, 100 and 120 of FIGS. 1, 2, 3 and 4, respectively, have a FOG processing electronics 113. Processing electronics 113 outputs a rotation rate signal to indicator 114. Processing electronics 113 may be an open-loop or a closed-loop design. FIGS. 5 and 6 reveal two versions, serrodyne 115 and dual ramp 116, respectively, of closed-loop electronics 113. The output of detector 63 of FIGS. 1 and 2 goes to an input of amplifier 117 which may be a one-input amplifier instead of a two-input summing amplifier. Outputs of detectors 69 and 93, in FIGS. 3 and 4, go to the two inputs of summing amplifier 117 of FIGS. 5 or 6. The outputs of detectors 69 and 93 may be connected to each other and inputted into a one-input amplifier 117 instead, as shown in FIG. 7, for any of the two-detector configurations. The output amplifier 117 goes to analog-to-digital (A/D) converter 118, for connecting the analog electrical signals representing the light signals from the respective loops 42, 45 and 60, which have a particular phase relationship representing a rate of rotation of the respective loop. Outputs of A/D converter 118 go to a digital synchronous demodulator 119 and a bias frequency generator and control logic 121 of a three-axis gyroscope digital processing application specified integrated circuit (ASIC) for a serrodyne circuit 115 and a dual ramp circuit 116, respectively. An oscillator 122 provides a frequency reference signal to bias frequency generator and control logic 121, which in turn outputs a frequency signal to demodulator 119, and a bias modulation signal and an enable axis signal for serrodyne generators 123, 124 and 125 of ASIC 115, and for dual ramp and bias generators 126, 127 and 128 of ASIC 116, for x, y and z axes, respectively.

In FIG. 5, each serrodyne generator 123, 124, 125 for the x-, y- and z-axes, respectively, has the output signal, which is a processed detector 69, 93, signal that is multiplexed for each axis generator from demodulator 119 going to an input of an axis accumulator 129 which outputs a signal to inputs of a serrodyne numerical control oscillator 130 and a rate clock numerical control oscillator 131. The outputs of oscillators 130 and 131 to inputs of counter 132 and logic circuit 133. Logic circuit 133 provides up-and-down clock signals and counter 132 provides a rotation rate dependent digital phase nulling signal to a respective axis channel of a triple digital-to-analog converter (DAC) 134. Converter 134 outputs analog phase nulling signals to driver amplifiers 135, 136, 137 for x-, y- and z-axes, respectively. The serrodyne outputs from amplifiers 135, 136 and 137 go to modulators 50, 44 and 61 of loops 45, 42 and 60, respectively, to null out the phase differences of counterpropagating light beams of the loops, caused by the Sagnac effect due to rotation of the respective loops. The serrodyne outputs indicate the rotation rates and are input to a rotation rate indicator and/or processor 114.

In FIG. 6, each dual ramp and bias generator 126, 127 and 128, of closed-loop ASIC 116, has an axis accumulator 138 that receives a signal from demodulator 119, which is a processed detector 69, 93, signal that is multiplexed for each axis generator, respectively, and outputs a signal to a dual ramp accumulator 139 and a rate clock numerical control oscillator 140. The output of dual ramp accumulator goes to an add-bias circuit 141 and the output of oscillator 140 goes to logic circuit 142. Logic circuit 142 provides up-and-down clock signals and add-bias circuit 141 provides dual ramp digital phase nulling signals to a respective axis channel of triple digital-to-analog converter 134. DAC 134 outputs dual ramp analog phase nulling signals to drive amplifiers 135, 136, 137 for x-, y-, and z-axes, respectively. The dual ramp outputs from amplifiers 135, 136 and 137 go to modulators 50, 44 and 61 of loops 45, 42 and 60, respectively, to null out the phase differences of counterpropagating light beams of the loops, caused by the Sagnac effect due to rotation of the respective loops. The dual ramp outputs indicate the rotation rates and are input to a rotation rate indicator and/or processor 114. FIG. 7 differs from FIG. 6, besides having a one-input amplifier 117, has three digital synchronous demodulators 119, that is, one demodulator 119 providing a processed detector 69, 93, output signal for each dual ramp and bias generator 126, 127, 128, of x-, y- and z-axes, respectively. Since each generator has its own demodulator 119, the processed detector signals to the generators are not multiplexed. The configuration of FIG. 7 is applicable to the serrodyne generator configuration of FIG. 5, also.

Figure 8:
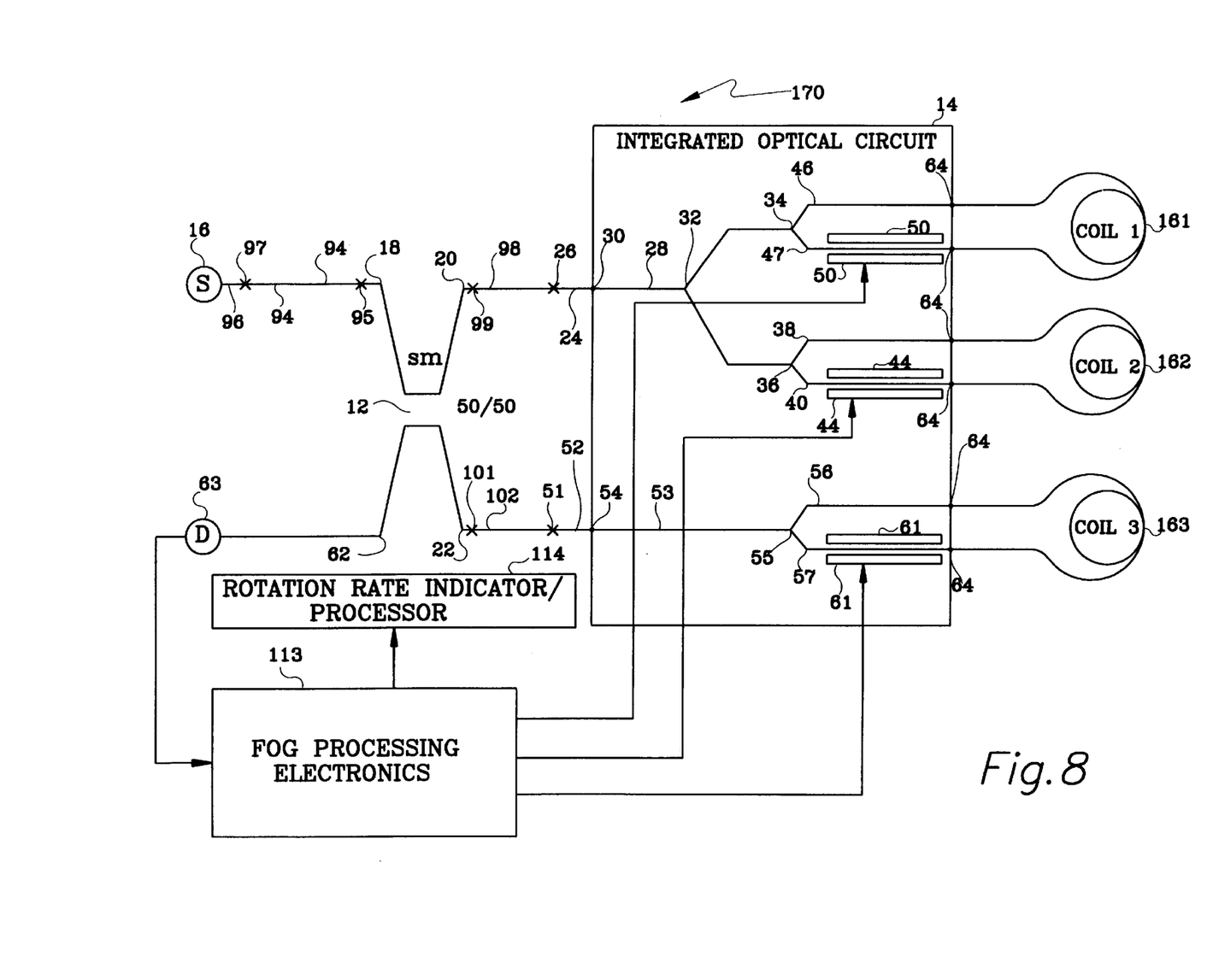
FIG. 8 reveals an optical configuration for the three axis gyroscope having one non-polarization maintaining coupler and four Y junctions, and being without depolarizers at the sensing loops.
Figure 9:
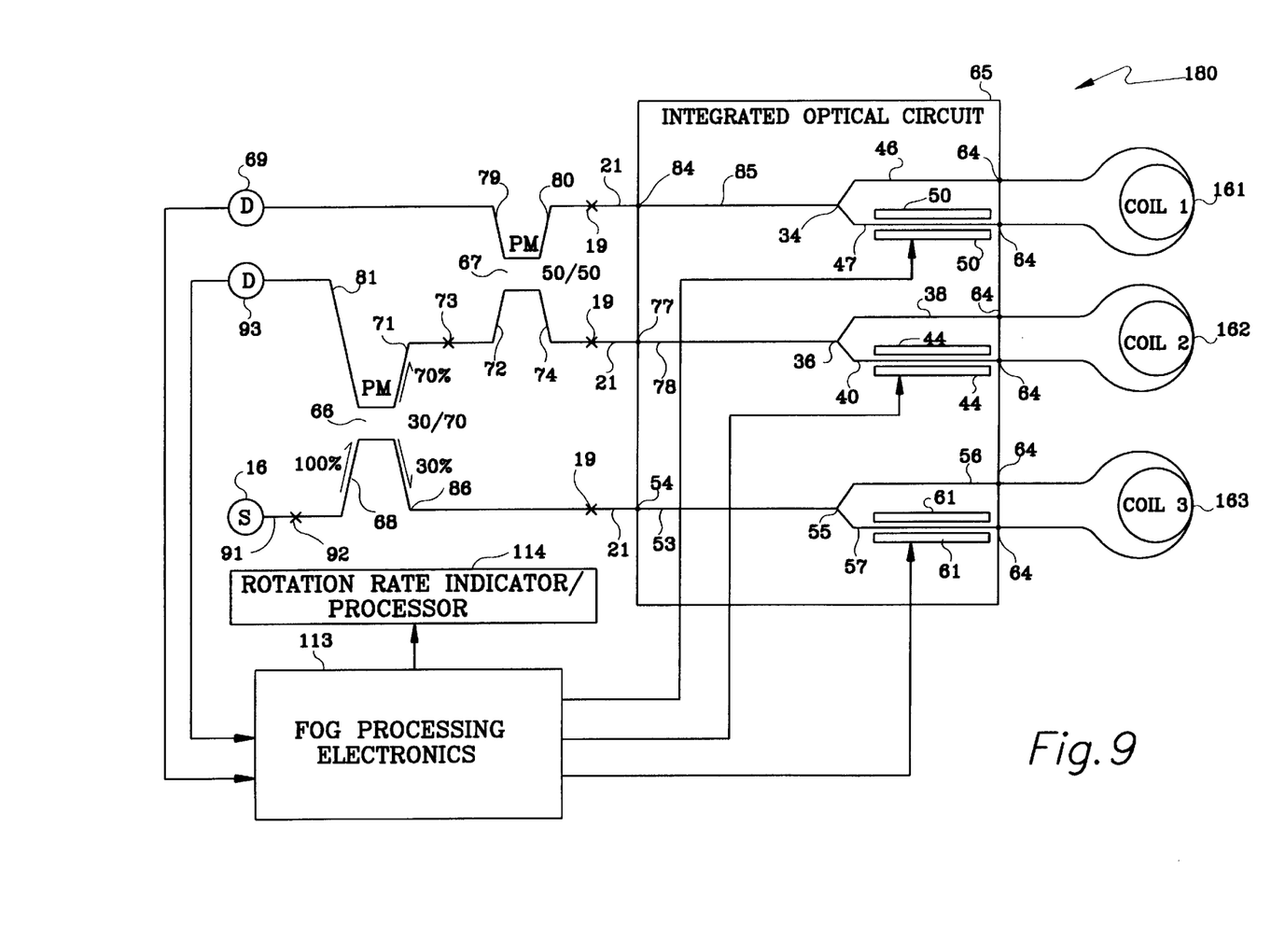
FIG. 9 reveals a three axis gyroscope having two polarization maintaining couplers and three Y junctions, and being without depolarizers at the sensing loops.

FIG. 8 shows a configuration 170 that is similar to configuration 90 of FIG. 2, except that depolarizers 48, 49, 41, 43, 58 and 59, and sensing coils 45, 42 and 60 are absent. Sensing coils 161, 162 and 163 are constructed from polarization maintaining fiber. FIG. 9 shows a configuration 180 that is similar to configuration 100 of FIG. 3a, except that depolarizers 48, 49, 41, 43, 58 and 59, and sensing coils 45, 42 and 60 are absent. Sensing coils 161, 162 and 163 are constructed from polarization maintaining fiber. Polarization maintaining sensing coils 161, 162 and 163, without depolarizers in the coils, may similarly be implemented in configurations 10, 100 and 120 of FIGS. 1, 3b, 4a and 4b.

Other variants of the invention, other than the embodiments disclosed here, may be implemented.

We claim:

1. A three-axis fiber optic gyroscope comprising:

a first coupler having first, second, third and fourth ports;

a source connected to the first port of said first coupler;

a detector connected to the second port of said first coupler;

a second coupler having a first port connected to the third port of said first coupler, a second port connected to a second detector, and having third and fourth ports;

a first Y junction having a first port connected to the third port of said second coupler, and having second and third ports;

a second Y junction having a first port connected to the fourth port of said second coupler, and having second and third ports;

a third Y junction having a first port connected to the fourth port of said first coupler, and having second and third ports;

a first sensing loop having first and second ends connected to the second and third ports, respectively, of said first Y junction;

a second sensing loop having first and second ends connected to the second and third ports, respectively, of said second Y junction; and a third sensing loop having first and second ends connected to the second and third ports, respectively, of said third Y junction.

2. The three axis fiber optic gyroscope of claim 1 further comprising:

first, second and third sets of modulator electrodes situated proximate to at least one port of said first, second and third Y junctions, respectively.

3. The three axis fiber optic gyroscope of claim 2, further comprising:

an at least one depolarizer in said first sensing loop;
an at least one depolarizer in said second sensing loop;
an at least one depolarizer in said third sensing loop.

4. The three axis fiber optic gyroscope of claim 3 wherein:

said first Y junction and first set of modulator electrodes are formed on a first integrated optical circuit;

said second Y junction and second set of modulator electrodes are formed on a second integrated optical circuit; and said third Y junction and third set of modulator electrodes are formed on a third integrated optical circuit.

5. The three axis fiber optic gyroscope of claim 3 wherein said first, second and third Y junctions and said first, second and third sets of modulator electrodes are formed on an integrated optical circuit.

6. The three axis fiber optic gyroscope of claim 5 further comprising:

an amplifier having inputs connected to the first and second detectors;

an analog-to-digital converter having an input connected to an output of said amplifier, and having an output;

a three axis gyroscope digital processing device having an input connected to the output of said analog-to-digital converter;

a digital-to-analog converter having an input connected to an output of said three axis gyroscope digital processing device, and having outputs connected to said first, second and third sets of modulator electrodes, respectively.

7. The three axis fiber optic gyroscope of claim 6 wherein said three axis gyroscope digital processing device is a closed loop feedback system that nulls out phase differences of counterpropagating light in said first, second and third sensing loops, by signals sent from the output of said digital-to-analog converter to said first, second and third sets of modulator elements, respectively, the magnitude of the signals indicative of the rate of rotation of the respective sensing loops.

8. The three axis fiber optic gyroscope of claim 6 wherein said three axis gyroscope digital processing device is a serrodyne closed loop feedback system.

9. The three axis fiber optic gyroscope of claim 6 wherein said three axis gyroscope digital processing system is a dual ramp closed loop feedback system.

10. The three axis fiber optic gyroscope of claim 6 wherein said three axis gyroscope digital processing system is a digital phase step closed loop feedback system.

11. The three-axis fiber optic gyroscope of claim 3 wherein said first and second couplers are polarization maintaining couplers.

12. The three-axis fiber optic gyroscope of claim 3 wherein said first and second couplers are non polarization maintaining couplers.

13. The three-axis fiber optic gyroscope of claim 12 further comprising:

a depolarizer connected between the third port of said second coupler and the first port of said first Y junction;

a depolarizer connected between the fourth port of said second coupler and the first port of said second Y junction; and a depolarizer connected between the fourth port of said first coupler and the first port of said third Y junction.

14. The three-axis fiber optic gyroscope of claim 13 wherein said first, second and third Y junctions are polarizing junctions.

15. The three-axis fiber optic gyroscope of claim 14 wherein said first, second and third sensing loops have non polarization maintaining fiber.

16. A three-axis fiber optic gyroscope comprising:

a first detector;

a second detector;

a light source;

a first coupler having a first port connected to said second detector, a second port connected to said source, and third and fourth ports;

a second coupler having a first port connected to said first detector, a second port connected to the third port of said first coupler, and third and fourth ports;

a first polarizer connected to the third port of said second coupler;

a second polarizer connected to the fourth port of said second coupler;

a third polarizer connected to the fourth port of said first coupler;

a third coupler having a first port connected to said first polarizer, and having second and third ports;

a fourth coupler having a first port connected to said second polarizer, and having second and third ports;

a fifth coupler having a first port connected to said third polarizer, and having second and third ports;

a first depolarizer connected to the second port of said third coupler;

a second depolarizer connected to the second port of said fourth coupler;

a third depolarizer connected to the second port of said fifth coupler;

a first non polarization maintaining fiber optic sensing loop having a first end connected to said first depolarizer and having a second end connected to the third port of said third coupler;

a second non polarization maintaining fiber optic sensing loop having a first end connected to said second depolarizer and a second end connected to the third port of said fourth coupler; and a third non polarization maintaining fiber optic sensing loop having a first end connected to said third depolarizer and a second end connected to the third port of said fifth coupler.

17. The three-axis fiber optic gyroscope of claim 16 wherein said first and second couplers are polarization maintaining fiber couplers.

18. The three-axis fiber optic gyroscope of claim 17 further comprising:

a fourth depolarizer connected between the third port of said third coupler and the second end of said first fiber optic sensing loop;

a fifth depolarizer connected between the third port of said fourth coupler and the second end of said second fiber optic sensing loop; and a sixth depolarizer connected between the third port of said fifth coupler and the second end of said third fiber optic sensing loop.

19. The three-axis fiber optic gyroscope of claim 16 wherein said first and second couplers are non polarization maintaining optic couplers.

20. The three-axis fiber optic gyroscope of claim 19 further comprising:

a fourth depolarizer connected between the third port of said second coupler and said first polarizer;

a fifth depolarizer connected between the fourth port of said second coupler and said second polarizer; and a sixth depolarizer connected between the fourth port of said first coupler and said third polarizer.

21. The three-axis fiber optic gyroscope of claim 20 further comprising:

a seventh depolarizer connected between the third port of said third coupler and the second end of said first fiber optic sensing loop;

an eighth depolarizer connected between the third port of said fourth coupler and the second end of said second fiber optic sensing loop; and a ninth depolarizer connected between the third port of said fifth coupler and the second end of said third fiber optic sensing loop.

22. A three-axis fiber optic gyroscope comprising:

a first coupler having first, second, third and fourth ports;

a source connected to the first port of said first coupler;

a detector connected to the second port of said first coupler;

a second coupler having a first port connected to the third port of said first coupler, a second port connected to a second detector, and having third and fourth ports;

a first Y junction having a first port connected to the third port of said second coupler, and having second and third ports;

a second Y junction having a first port connected to the fourth port of said second coupler, and having second and third ports;

a third Y junction having a first port connected to the fourth port of said first coupler, and having second and third ports;

a first sensing loop having polarization maintaining optical fiber, and having first and second ends connected to the second and third ports, respectively, of said first Y junction;

a second sensing loop having polarization maintaining optical fiber, and having first and second ends connected to the second and third ports, respectively, of said second Y junction; and a third sensing loop having polarization maintaining optical fiber, and having first and second ends connected to the second and third ports, respectively, of said third Y junction.

* * * * *